United States Patent [19]

Chou

[11] Patent Number: 4,959,891
[45] Date of Patent: Oct. 2, 1990

[54] ATTACHMENT DEVICE FOR STRAP END

[76] Inventor: An-Chuan Chou, No. 212, Yung-An Street, Tainan, Taiwan

[21] Appl. No.: 500,184

[22] Filed: Mar. 28, 1990

[51] Int. Cl.$^5$ .............................. A44C 5/18; F16B 1/00
[52] U.S. Cl. ................... 24/265 A; 24/265 R
[58] Field of Search ............. 24/265 A, 265 R, 265 C, 24/265 BC, 265 EC, 20 CW, 20 W, 20 EE; 224/150

[56] References Cited

U.S. PATENT DOCUMENTS

| | | | |
|---|---|---|---|
| 943,135 | 12/1909 | Boyer | 24/265 A |
| 1,944,646 | 1/1934 | McMurray | 24/265 A |
| 2,619,700 | 12/1952 | Turek | 24/265 A |
| 2,806,275 | 9/1957 | Stoll | 24/265 BC |
| 3,296,673 | 1/1967 | Kirkpatrick | 24/265 A |
| 4,387,490 | 6/1983 | Blackburn et al. | 24/265 A |
| 4,765,035 | 8/1988 | Servay | 24/265 A |
| 4,827,578 | 5/1989 | Heckerman et al. | 24/265 A |

Primary Examiner—Victor N. Sakran
Attorney, Agent, or Firm—Morton J. Rosenberg; David I. Klein

[57] ABSTRACT

An overlapped end of a strap is secured to a member such as a hook by an attachment device comprising a substantially U-shaped clamp made of deformable material such as metal plate and having a flat bottom formed with a series of transverse recesses and a securing member including a plate body formed with a series of transverse spiny protuberances. Said overlapped end of strap extends between the securing member and flat bottom of the clamp for connection by press to flatten side walls of the clamp and plunge the protuberances of the securing members into corresponding recesses with spikes piercing the overlapped strap.

1 Claim, 4 Drawing Sheets

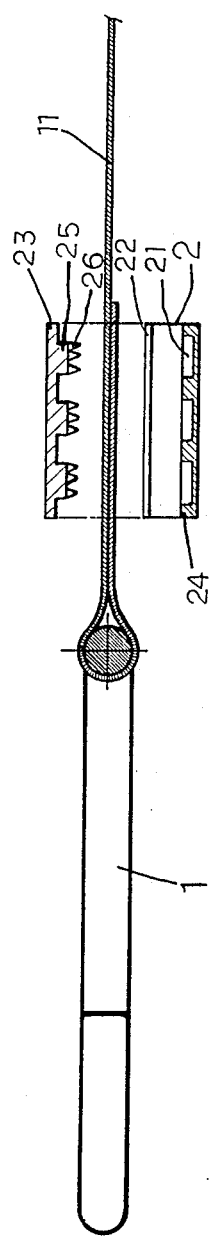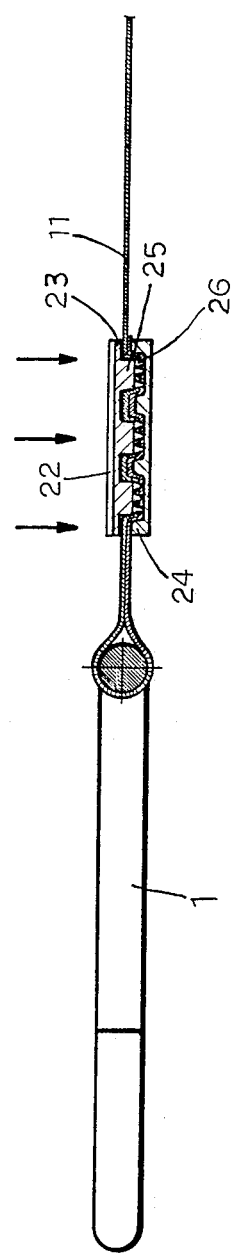

ATTACHMENT DEVICE FOR STRAP END

BACKGROUND OF THE INVENTION

This invention relates to an attachment device such as a splice in strap made of strong clotch material such as canvas and the like.

It is known to provide sewing connections between overlapped strap ends. As shown in FIG. 1, a hook member 1 terminates with a ring member 17 which is received by a return-bent end of a strap 11. An upper segment of strap 11 is inserted through the opening of the ring member 17 and further returned to overlap a lower segment of the strap 11. The upper and lower overlapped segments are generally attached by sewing a substantially rectangular pattern including side lines 12, 13, 15, 16 and diagonal lines 14. It is found disadvantegous that the attachment between the upper and lower segments may become loose and further separate by long-lasting tension transmitted therein. To this end, the inventor has attempted to make an improved attachment device for strap end to overcome the drawbacks of a known device.

SUMMARY OF THE INVENTION

An object of this invention is to provide an attachment device for strap end which can diminish the disadvantage of a known attachment.

It is another object of this invention to provide an attachment device which enables a rapid and tough connection between overlapped segments of a strap.

With the above object in view, the invention provides an attachment device for connection of an overlapped segments of a strap forming means for securing to a member such as a hook member. Said attachment device comprises a substantially U-shaped clamp made of deformable material such as metal plate and having a flat bottom formed with a series of transverse recesses and a securing member including a plate body formed with a series of transverse spiny protruberances. Said overlapped end of strap extends between the securing member and flat bottom of the clamp for connection by press to flatten side walls of the clamp and plunge the protruberances of the securing members into corresponding recesses with spikes piercing the overlapped strap.

BRIEF DESCRIPTION OF THE DRAWINGS

An embodiment of the invention is shown, by way of example, in the accompanying drawings, in which:

FIG. 3 is a cross-sectional view of the device of this invention, which is in a prior to attachment state, applied to an overlapped end of a strap which is attached to a hook member;

FIG. 4 is a similar view to FIG. 3 wherein the device of this invention is in a connecting state.

DETAILED DESCRIPTION OF THE PREFERRED EMBODIMENT

Figure 1:
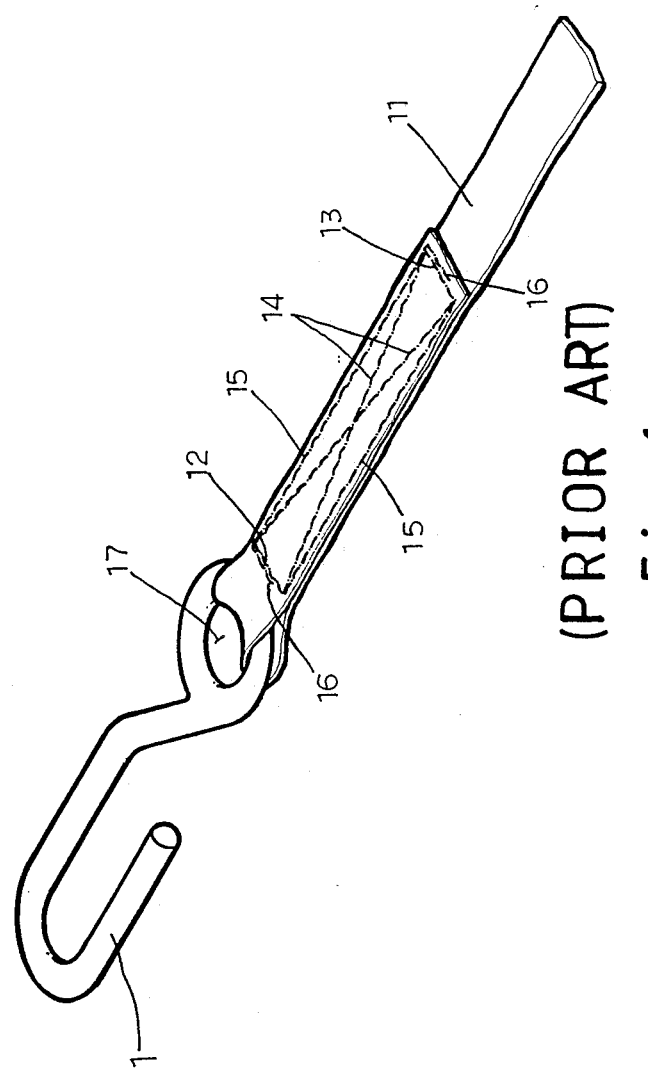
FIG. 1 is a perspective view illustrating a known art to secure return-bent and overlapped end of a strap which is attached to a hook member.
Figure 2:
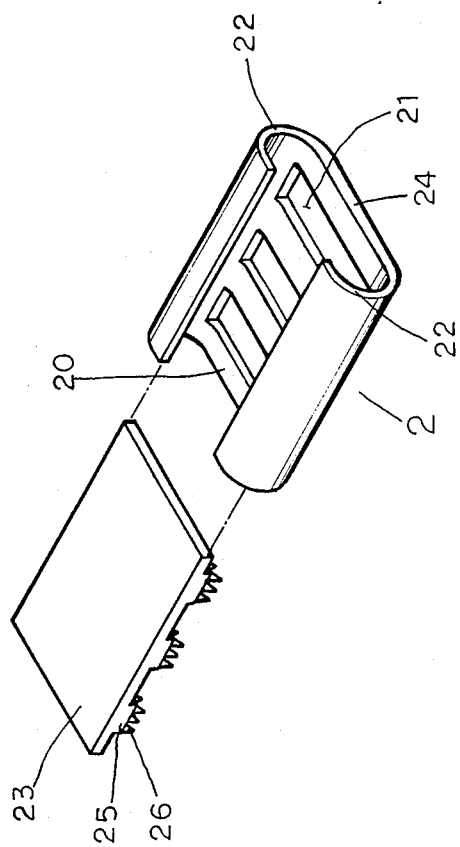
FIG. 2 is an exploded perspective view showing the preferred embodiment of this invention.
Figure 5:
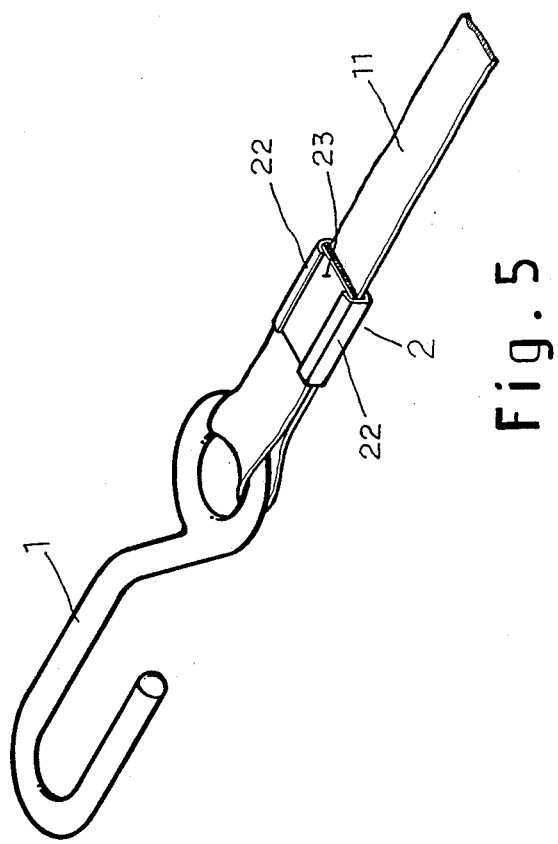
FIG. 5 is a perspective view corresponding to FIG. 4.

Referring to FIG. 2, the attachment device according to this invention comprises a clamp member 2 made of deformable material such as metal plate and a securing piece 23. Said clamp member 2 has a flat bottom 24, which is formed with a series of transverse grooves 21, and opposed arcuate side walls 22 extending upwardly inwardly. The securing piece 23 is a rectangular plate in shape which is so dimensioned to allow itself passing freely through a longitudinal tunnel or passage 20 defined by the clamp member 2. The bottom side of the securing piece 23 has a series of transverse protuberances 25 which are substantially complementary to the recesses 21 in the clamp member 2 and provided with a plurality of spikes 26 extending downwardly.

As shown in FIGS. 3, 4 ad 5, an overlapped end of a strap 11 which forms means for attaching a hook member 1 is placed longitudinally between the securing piece 23 and the bottom 24 of the clamp member 2. The clamp member 2 together with the securing piece 23 and overlapped end of the strap 11 therebetween are pressed with a press machine or hammer to flatten the arcuate side walls 22 of the clamp member 2 that pushes the scuring piece 23 downwwardly with respect to the bottom 24 of the clamp member 2 witth protruberances 25 plunged into respective recesses 21 and spikes 26 piercing the overlapped strap 11 wherein a portion of the overlapped strap is cramped to be periphrastic in its longitudinal distribution between the clamp member 2 and the securing piece 23 when pressed.

It is intended that all matter contained in the above description or shown in the accompanying drawing be interpreted as illustrative and not in a limiting sense. It is also to be understood that the following claim is intended to cover all of the generic and specific features of the invention herein described.

What is claimed is:

1. An attachment device for strap end comprising:
    an elongated clamp member made of deformable material and having a flat bottom formed with a plurality of transverse recesses in one side thereof and opposed arcuate side walls defining a passageway along its longitudinal direction; and
    a securing piece having a plate boy dimensioned to pass through the passageway defined by the clamp member and formed with a plurality of transverse protruberances having spikes thereon for engaging the trnasverse recesses by press through an overlapped section of a strap extending between the bottom of the clamp member and the securing means.

* * * * *